June 17, 1952   H. J. PASSINO   2,600,802
PLASTICIZATION OF PERHALOCARBON POLYMERS
Filed March 25, 1949
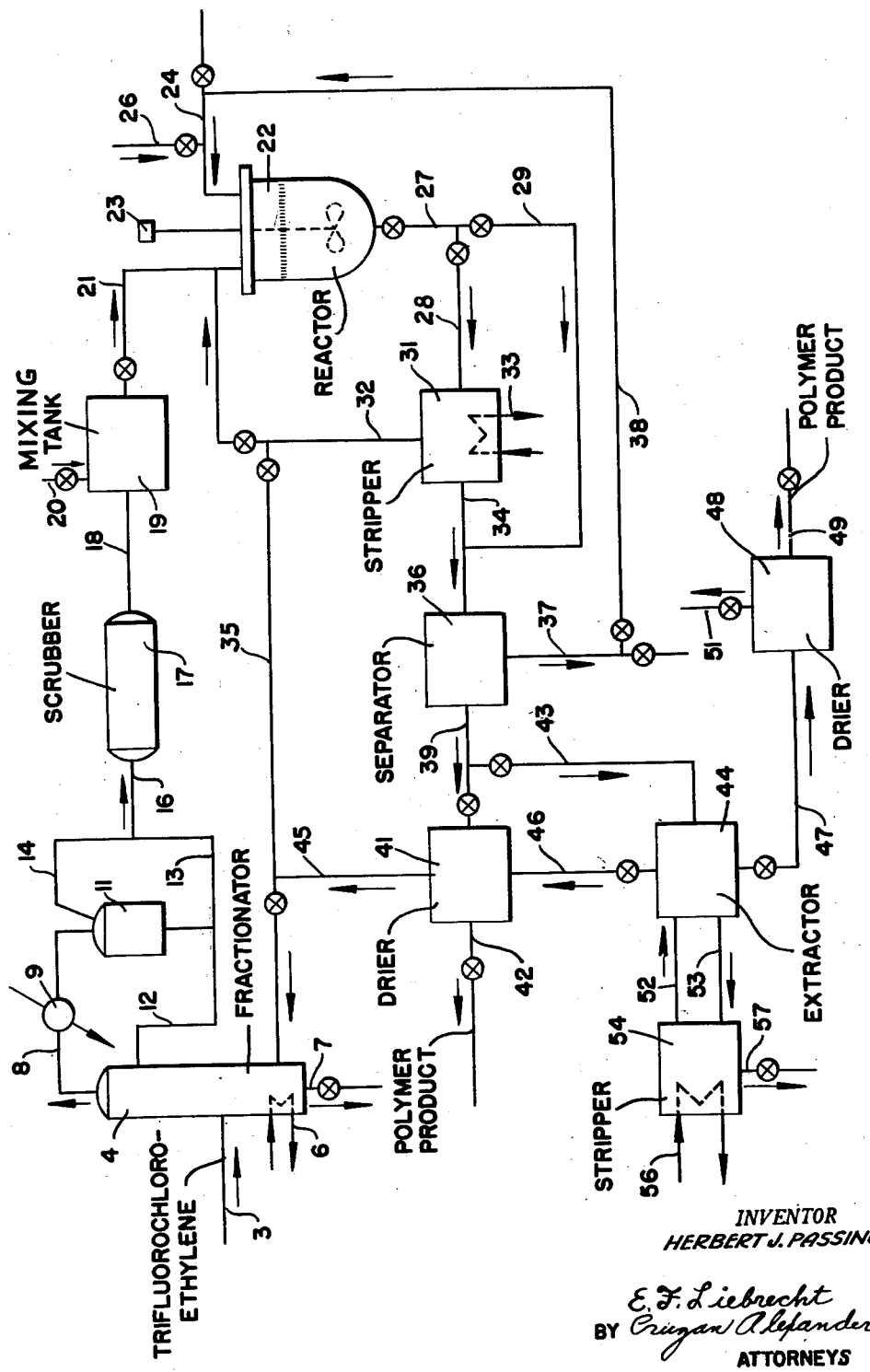
INVENTOR
HERBERT J. PASSINO
BY E. F. Liebrecht
   Crigan Alexander
ATTORNEYS Patented June 17, 1952

2,600,802

UNITED STATES PATENT OFFICE 2,600,802

PLASTICIZATION OF PERHALOCARBON POLYMERS

Herbert J. Passino, Englewood, N. J., assignor to The M. W. Kellogg Company, Jersey City, N. J., a corporation of Delaware Application March 25, 1949, Serial No. 83,451

8 Claims. (Cl. 260—33.8)

This invention relates to the plasticization of perhalocarbon polymers. In one of its aspects this invention relates to the production of solid perhalocarbon polymers of modified mechanical and physical characteristics and modified composition. In another aspect this invention relates to the polymerization of trifluorochloroethylene in a continuous manner to produce a normally solid polymer having improved characteristics.

Various unsaturated perhalocarbons may be polymerized under suitable conditions to produce solid polymers of good physical and mechanical stability. In many instances the resulting solid products have physical characteristics such that it is difficult to mold or form products of the desired shape, or have physical characteristics, such as brittleness, which makes their use limited. To alter these physical characteristics of the solid polymers it has been proposed to incorporate plasticizers in the crude polymer product so as to enable easier mechanical handling thereof or to modify their physical characteristics to the desired extent. These plasticizers may be incorporated with the polymer product by various means. For example, the plasticizer may be worked or kneaded into the solid polymer. Alternatively, the solid plastic may be polymerized to a finely-divided form and mixed with the plasticizer and then compressed to form a solid mass. In many instances the plasticizer is difficultly miscible with the polymer product and is not easily dispersed throughout the mass. This is particularly the case when attempting to incorporate a plasticizer into a large mass of polymer, such as that produced in a bomb type reactor.

In producing a solid polymer of trifluorochloroethylene, plasticizers are often employed in combination with the resulting product to modify and improve the physical characteristics thereof. Polymerization of trifluorochloroethylene to a solid polymer is presently effected by a batch-wise process in a bomb type reaction vessel. In the production of the solid polymer, the monomer is introduced into the bomb together with a suitable promoter and the temperature of the bomb is usually maintained at about −16 or −17° C. for a period of about seven days. The monomer is converted to a porous plug of the solid polymer in the reaction bomb. The unreacted monomer is included in the interstices of the porous plug and is removed by heating the plug in the reaction vessel under subatmospheric pressure so that the monomer is evaporated. After the unreacted monomer has been evaporated, the plug is removed from the reaction bomb and broken into chips or granules. Depending upon its proposed use, often a suitable plasticizer, for example, polymer oil made from the same monomer, is admixed in appropriate amount with the chips or granules of the solid polymer and the mass worked or kneaded into a homogeneous mixture. Relatively small proportions of plasticizer are employed and after suitable working and kneading the mass is molded or formed into the desired shape by compression, rolling, etc. As previously stated, admixing of the plasticizer with the solid polymer and the working thereof into the polymer material is difficult and requires an excessive amount of energy and time. It is much to be desired, therefore, to provide a method which could diminish the time and effort required and also to insure uniform dispersion of the plasticizer in the solid polymer mass.

The object of this invention is to provide a method for incorporating a plasticizer with a solid perhalocarbon polymer.

Another object of this invention is to provide a method of polymerizing the monomer trifluorochloroethylene to a solid polymer of modified and improved characteristics Still a further object of this invention is to provide a method for obtaining uniform dispersion of a plasticizer in a solid perhalocarbon polymer, such as a solid polymer of trifluorochloroethylene.

Various other objects and advantages of the present invention will become apparent to those skilled in the art from the accompanying description and disclosure.

As herein defined, polymerization refers to polymerization of a single monomer and also to the co-polymerization of unlike monomers to produce a polymer of increased molecular weight.

According to this invention, an unsaturated perhalocarbon monomer is polymerized in the presence of a plasticizer under suitable conditions of temperature, pressure, residence time and promoting agent to produce a normally solid perhalocarbon polymer having modified and improved chemical and physical characteristics as compared to the polymer produced without the presence of the plasticizer. The solid polymers produced by the process of this invention are those which retain their shape but are capable of being deformed by heating, compression, etc. The polymers produced are also characterized by the fact that their physical and chemical properties are modified by the presence of the plasticizer during polymerization, such that the resulting solid polymer may have any one of the following modified characteristics, namely, hardness, resilience, softening point, brittleness, translucency, plasticity and stability, as compared with the normal product produced without the presence of the plasticizer under otherwise comparable or substantially identical conditions of polymerization. The polymerization process of this invention may be effected in either a batch-wise or continuous manner. The monomer is usually admixed with the plasticizer and introduced into a suitable polymerization zone under the appropriate conditions of polymerization in the liquid phase A suitable diluent or heat dissipating medium may also be admixed with the monomer without departing from the scope of this invention. The resulting product is separated from the reaction mixture by any suitable method, such as by settling and decantation, filtering, centrifuging, and evaporation. The method of separation and recovery of the solid polymer will depend upon various factors, such as the extent of polymerization, the amount of diluent, if any, employed, and the design and shape of the apparatus.

The present invention contemplates the use of various perhalocarbon monomers for producing the solid polymer. These perhalocarbon monomers comprise trifluorochloroethylene, perfluorobutadiene, perfluoropropene, perfluorostyrene, perfluorocyclobutene, perfluorocyclobutadiene, and tetrafluoroethylene. As previously mentioned, the invention applies particularly to the polymerization of trifluorochloroethylene to produce a solid polymer. It also applies to the co-polymerization of various monomers such as, for example, the co-polymerization of trifluorochloroethylene and tetrafluoroethylene, the co-polymerization of perfluorobutadiene and perfluorostyrene, and the co-polymerization of perfluoropropene and trifluorochloroethylene to produce solid polymers.

The plasticizer employed in the present invention is one which is liquid under the operating conditions and which imparts to the resulting solid polymer modified and improved characteristics. Suitable plasticizers comprise the oils, greases and waxes obtained by the polymerization of trifluorochloroethylene, acetone, chloroform, carbon tetrachloride, methylene chloride, dichloroethylene, trichloroethylene, tetrachloroethylene, 1,1,2 - trifluorotrichloroethane 1,2-, 1,1-difluorotetrachloroethane, perfluoroethers, perfluoroketones, perchloroethers, perchloroketones and various other halogenated hydrocarbons. The plasticizer must be at least partially miscible and substantially non-reactive with the polymer product. The weight ratio of monomer to plasticizer employed is usually in the range of about 50:1 to about 1:1, preferably between about 25:1 to about 10:1. The amount of plasticizer employed will depend in general upon the desired extent of modification to be effected on the resulting solid polymer, the exact ratio being within the determination of one skilled in the art for each particular set of reaction conditions employed and product desired.

Since the present invention has particular application to the plasticization of solid polymers of trifluorochloroethylene, although not limited thereto, suitable and preferred plasticizers for this polymer are the oils, greases and waxes of the monomer itself. These oils, greases and waxes are produced at higher temperatures than employed for the production of the solid polymer and in the presence of a chain transfer reactant, such as chloroform. For a more complete discussion of the manner of producing solid polymers and oils of trifluorochloroethylene, reference may be had to applications Serial Nos. 14,797 filed March 13, 1948, by William T. Miller, now Patent No. 2,579,437; 20,612 filed April 13, 1948, by John S. Rearick and 61,082 filed November 19, 1928, by Albert L. Dittman, John M. Wrightson and Herbert J. Passino. These applications disclose in general the various operating conditions, apparatus and characteristics of the product produced by the polymerization of trifluorochloroethylene.

The drawing is a diagrammatic illustration of an arrangement of apparatus in elevation for a continuous process for the production of a normally solid polymer of modified and improved physical and chemical characteristics from the monomer trifluorochloroethylene. The starting material trifluorochloroethylene may be prepared by dechlorinating Freon 113, trifluorotrichloroethane, in the presence of powdered zinc. According to the drawing, trifluorochloroethylene together with any impurities accompanying the monomer is introduced into a fractional distillation column 4 through conduit 3. Recycled monomer is introduced into the lower portion of column 4 through conduit 35. In fractionator 4, trifluorochloroethylene is recovered as an overhead fraction in substantially pure form. Liquid bottoms are maintained at the desired temperature of about 86° C. at atmospheric pressure by a conventional heating or cooling element 6. Undesirable high boiling components or impurities accompanying the trifluorochloroethylene are withdrawn from fractionator 4 through conduit 7 for disposal. These undesirable components comprise alcohol and acidic by-products. Vaporous trifluorochloroethylene is removed from the upper portion of fractionator 4 and passed through conduit 8 and condenser 9 to accumulator 11. At least a portion of the trifluorochloroethylene is condensed by condenser 9 which is maintained at a temperature of about −28° C. for atmospheric pressure operations. Condensate is returned from accumulator 11 through a conduit 12 to the upper portion of fractionator 4 as reflux. Alternatively or additionally to refluxing with condensate in conduit 12, internal cooling means (not shown) may be positioned within the upper portion of fractionator 4 for creating an internal reflux.

If only that much of the vapors in conduit 8 are condensed so as to provide reflux to fractionator 4, the remaining vapors are removed from accumulator 11 and are passed through conduits 14 and 16 to a scrubber 17 to remove acidic material from the monomer stream. In treater 17 the monomer stream is contacted with a caustic solution of sodium or potassium hydroxide. This treatment in scrubber 17 may also comprise contact with suitable sorbents, such as silica-gel, phosphoric pentoxide and activated carbon, for removal of traces of contaminants, such as alcohol. Scrubber 17 is used in order to obtain a monomer of high purity which is desirable for the polymerization of trifluorochloroethylene to a solid polymer of good physical and chemical properties.

In case it is desired to treat the monomer in the liquid phase, liquid monomer is withdrawn from accumulator 11 and passed through conduits 13 and 16 to scrubber 17 for liquid-liquid contact with a caustic solution and/or sorbents. When this modification is employed, condenser 9 is operated so as to condense substantially all of the effluent in conduit 8.

Liquid monomer is withdrawn from scrubber 17 and passed through conduit 18 to a mixing tank 19. In the event the monomer is treated in scrubber 17 in the vapor phase, a condenser (not shown) is provided on conduit 18 to condense the vapors. A plasticizer in the appropriate quantity is introduced into mixing tank 19 where it is thoroughly dispersed in the monomer. Preferably, the plasticizer is a polymer oil of trifluorochloroethylene. This oil is produced at about 75 to 100° C. in the presence of a small amount of chloroform as a chain transfer solvent. The crude oil removed from the polymerization zone is fractionated into a desired fraction boiling between about 100 and 250° C. at 1–2 mm. of mercury. This fraction is then fluorinated with chlorine trifluoride or cobaltic fluoride to render it stable and substantially non-reactive. The quantity of polytrifluorochloroethylene oil introduced into mixing tank 19 is about 0.1 part by weight per part by weight of monomer; the amount of plasticizer, however, will depend on various factors as previously discussed.

From mixing tank 19, the purified liquid monomer including the plasticizer in appropriate quantity is passed through conduit 21 to a polymerization reactor 22. Water or other diluent may be introduced into reactor 22 through conduit 24 to aid in the removal of the heat of polymerization as hereinafter described. The introduction of water and/or monomer may be intermittent or continuous. A suitable promoter, such as sodium perborate, is also introduced in measured quantities by means of conduits 26 and 24. The temperature of reaction employed may be about 10° C. to about 50° C. but higher or lower temperatures may be used without departing from the scope of this invention. In order to maintain the monomer in the liquid phase a pressure of about 100 pounds per square inch gage or higher is maintained in reactor 22. Liquid monomer and water are vigorously and intimately admixed in reactor 22 by means of a conventional stirrer 23.

If water is used as a diluent, the quantity of water employed for removal and absorption of the heat of polymerization in reactor 22 is between about 1 and about 3 times that of the monomer. A preferred amount of sodium perborate is between about 0.5 and about 5 weight per cent based on the monomer in reactor 22. The average residence time of the monomer in order to produce solid polymer is between about 5 and about 35 hours. The solid polymer containing the plasticizer forms as a white powder and is removed as a slurry with water and unreacted monomer through conduit 27.

The slurry of solid polymer is passed from reactor 22 through conduits 27 and 28 to a stripping unit 31 in which unreacted monomer is stripped from the slurry containing polymer by increasing the temperature and/or decreasing the pressure of the system. Vaporized monomer is withdrawn overhead from stripper 31 through conduit 32 and may be recycled to reactor 22, or all or a portion thereof may be passed through conduit 35 to fractionator 4. Numeral 33 indicates heating coils for stripping purposes. When passing the monomer from stripper 31 to fractionator 4, a condenser is usually positioned on conduit 35 to condense the monomer stream prior to introduction into fractionator 4.

A slurry of polymer and water substantially free from monomer is withdrawn from stripper 31 through conduit 34 and is passed to a separator 36. In separator 36, the stripped polymer floats on the water by virtue of which it is easily separated from the water by conventional mechanical means. Water which may contain the promoter or other agents may be recycled to reactor 22 through conduits 37 and 38, if desired. If the water contains undesirable contaminants produced by the reaction, the water may be withdrawn through conduit 37 for disposal.

In some instances the stripping operation in unit 31 may be eliminated and the slurry of polymer, unreacted monomer and water passed from reactor 22 through conduits 27, 29 and 34 directly to separator 36 by proper adjustment of the valves on conduits 28 and 29. When the stripping step is eliminated the polymer will be heavier than water and will settle to the bottom of separator 36, from where it is removed and recovered.

Separated polymer which may or may not contain monomer is passed from separator 36 through conduit 39 to drier 41. In drier 41 water and/or monomer are evaporated and passed through conduit 43 for return through conduits 45, 35 and 32 to reactor 22, or to fractionator 4 through conduits 45 and 35. If desired, the vapors removed from drier 41 may be vented to the atmosphere; this usually being the case when the stripping step is employed. On the other hand, when the stripping step is not used the vapors in conduit 45 will contain an appreciable amount of monomer and it is preferred under such circumstances to recycle the monomer to reactor 22 or fractionator 4. Dried polymer is removed from drier 41 through conduit 42 as a product of the process.

In a modification of the present process in which the solid polymer may contain excess amounts of promoter, such as sodium borate, having adverse affects on the polymer product, the separated solid polymer is passed from conduit 39 through conduit 43 to an extractor 44. In extractor 44 the polymer is washed with an aqueous solution, preferably an aqueous solution of alcohol to dissolve the inorganic peroxides contained in the polymer. The solid polymer is allowed to settle in extractor 44 and may be passed through conduit 46 to drier 41, if desired. The aqueous solution containing the extracted peroxides or other impurities is removed from extractor 44 through conduit 53 and passed to a stripper 54. In stripper 54 an overhead fraction comprising an aqueous solution of alcohol is obtained and returned to extractor 44 through conduit 52. A bottoms fraction comprising water and impurities, such as inorganic peroxide, is removed from stripper 54 through conduit 57. Since the inorganic peroxide may be useful as a promoter for the polymerization reaction, the stream in conduit 57 may be returned to reactor 22 by means not shown. Element 56 is a heating coil or reboiler for heating stripper 54 to a sufficiently high temperature to vaporize the extracting agent. Methyl alcohol may be admixed in about a 1:1 weight ratio with water for use in extractor 44.

In the event it is undesirable to pass the treated polymer from extractor 44 to drier 41 because of the presence of alcohol which may contaminate the monomer, the extracted polymer may be passed through conduit 47 to drier 48. In drier 48 the alcohol and water contained in the solid polymer are evaporated by regulation of the temperature and/or pressure therein in the conventional manner. The vaporized components are removed from drier 48 through conduit 51. Dried polymer containing the plasticizer is removed from drier 48 through conduit 49 as a product of the process.

The solid polymer recovered at 42 or 49 contains the plasticizer as a homogeneous mixture. The polymer product may be subjected to further treatment such as pyrolysis, fluorination, chlorination, etc. without departing from the scope of this invention. Various modifications and alterations of the arrangement of the equipment may become apparent to those skilled in the art. Certain pieces of apparatus and auxiliary equipment, such as liquid level controls, flow controls, temperature and pressure controls, valves, pumps, coolers or condensers, heaters and storage vessels have been omitted from the drawing as a matter of convenience and clarity.

With the diluent, the reactor is cooled or heated by controlling the quantity and temperature of the fresh and/or recycled diluent introduced into the reactor. Because of the high heat transfer rate of the diluent, such as water, temperature control of the reactor is relatively simple and accurate without wide variations in temperature occurring. Control of the reactor temperature is usually maintained by means of a cooler (not shown) positioned on recycle conduit 38, which removes the heat of polymerization absorbed by the diluent. The temperature of the reactor may be maintained substantially constant at the desired level without the use of a diluent, if desired, by indirect heat transfer with the reactor, such as by immersing the reactor in a liquid bath or by using coils positioned within the reactor.

I claim:

1. The method of plasticizing a solid polymer of trifluorochloroethylene which comprises polymerizing trifluorochloroethylene at a temperature between about 10° C. and about 50° C. to produce a homopolymer of trifluorochloroethylene in the presence of polytrifluorochloroethylene oil present in a weight ratio of monomer to oil of about 50:1 to about 1:1.

2. A continuous process for polymerizing trifluorochloroethylene to a normally solid polymer of improved chemical and physical characteristics which comprises introducing trifluorochloroethylene, a polytrifluorochloroethylene oil as a plasticizer, and water into a reaction zone in the presence of an inorganic peroxide as a promoter, maintaining the reactor at a temperature between about 10 and about 50° C. and under sufficient pressure to maintain the monomer in the liquid phase, vigorously agitating the mixture of monomer, plasticizer, and water, maintaining an average residence time of monomer in said reactor such that a normally solid homopolymer of trifluorochloroethylene is produced, withdrawing a slurry of monomer, solid polymer and water from said reaction zone, stripping the monomer from said slurry and returning stripped monomer to said reaction zone, separating solid polymer from water from said reaction zone and returning the water thus separated to said reaction zone, drying the polymer, and recovering dried plasticized polymer as a product of the process.

3. A process for polymerizing trifluorochloroethylene to a normally solid polymer of improved chemical and physical characteristics which comprises introducing trifluorochloroethylene, a polytrifluorochloroethylene oil as a plasticizer, and water into a reaction zone in the presence of an inorganic peroxide as a promoter, maintaining the reactor under sufficient pressure to maintain the monomer in the liquid phase at the temperature employed, vigorously agitating the mixture of monomer, plasticizer, and water, maintaining an average residence time of monomer in said reactor such that a normally solid homopolymer of trifluorochloroethylene is produced, withdrawing a slurry of monomer, solid polymer and water from said reaction zone, separating solid polymer from water from said reaction zone, drying the polymer, and recovering dried plasticized polymer as a product of the process.

4. The method for plasticizing a solid polymer of trifluorochloroethylene which comprises polymerizing trifluorochloroethylene in the presence of polytrifluorochloroethylene which is liquid under the polymerization conditions under conditions to produce a normally solid homopolymer of trifluorochloroethylene containing plasticizer.

5. The method of plasticizing a solid polymer of trifluorochloroethylene which comprises polymerizing the single monomer trifluorochloroethylene to produce a homopolymer thereof in the presence of polytrifluorochloroethylene oil present in a weight ratio of monomer to oil of about 10.

6. A process for plasticizing a normally solid perhalocarbon polymer which comprises admixing polytrifluorochloroethylene of lower molecular weight than said normally solid halogenated polymer to be plasticized and a material selected from the group consisting of trifluorochloroethylene and trifluorochloroethylene and another halogenated olefin and polymerizing the aforesaid material in the presence of said polytrifluorochloroethylene which is a liquid under the conditions of polymerization under conditions such that a solid polymer of modified mechanical and physical characteristics is produced.

7. The process of claim 6 in which trifluorochloroethylene is copolymerized with tetrafluoroethylene.

8. The process of claim 6 in which trifluorochloroethylene is copolymerized with perfluoropropene.

HERBERT J. PASSINO.

REFERENCES CITED

The following references are of record in the file of this patent:

UNITED STATES PATENTS

| Number | Name | Date |
|---|---|---|
| 2,230,654 | Plunkett | Feb. 4, 1941 |
| 2,393,967 | Brubaker | Feb. 5, 1946 |
| 2,394,243 | Joyce | Feb. 5, 1946 |
| 2,398,926 | Dorough | Apr. 23, 1946 |
| 2,456,255 | Coffman et al. | Dec. 14, 1948 |
| 2,513,312 | Hanford | July 4, 1950 |

OTHER REFERENCES

Hooker Chemicals Advertisement, Chemical & Engineering News, Dec. 25, 1943 vol. 21, No. 4, page 2084.

Miller et al., Ind. and Eng. Chem., vol. 39, No. 3, pp. 333 and 337.